United States Patent
Aharoni

(10) Patent No.: US 10,927,965 B2
(45) Date of Patent: Feb. 23, 2021

(54) PILOT HYDRAULIC SYSTEM FOR OPERATING CONTROL VALVE

(71) Applicant: R.F.G Trading LTD., Tel Aviv (IL)

(72) Inventor: Benyamin Aharoni, Tel Aviv (IL)

(73) Assignee: R.F.G. TRADING LTD., Tel Aviv (IL)

( * ) Notice: Subject to any disclaimer, the term of this patent is extended or adjusted under 35 U.S.C. 154(b) by 0 days.

(21) Appl. No.: 14/928,984

(22) Filed: Oct. 30, 2015

(65) Prior Publication Data
US 2016/0123481 A1    May 5, 2016

Related U.S. Application Data

(60) Provisional application No. 62/073,703, filed on Oct. 31, 2014.

(51) Int. Cl.
*F16K 11/02* (2006.01)
*F16K 11/07* (2006.01)
(Continued)

(52) U.S. Cl.
CPC ............ *F16K 11/022* (2013.01); *F16K 11/04* (2013.01); *F16K 11/07* (2013.01);
(Continued)

(58) Field of Classification Search
CPC ........ F16K 11/02; F16K 11/022; F16K 11/04; F16K 11/044; F16K 11/048; F16K 11/06;
(Continued)

(56) References Cited

U.S. PATENT DOCUMENTS 1,350,438 A * 8/1920 Davidson ................ F15B 13/02
137/625.48
1,575,771 A * 3/1926 King .................... F16K 11/048
137/112
(Continued)

FOREIGN PATENT DOCUMENTS

CN         1598376 A       3/2005
DE       22 06 001 A       8/1973
(Continued)

OTHER PUBLICATIONS

International Search Report and Written Opinion of International Application No. PCT/IB2015/002202, dated Apr. 25, 2016.
(Continued)

*Primary Examiner* — Robert K Arundale
*Assistant Examiner* — Richard K. Durden
(74) *Attorney, Agent, or Firm* — Fay Sharpe LLP

(57) ABSTRACT

A pilot valve system is controlled by the pressure differential between a lower chamber and an upper chamber. A fluid passageway in the lower chamber fluidly connects an inlet to first and second outlets. By varying the pressure differential, the placement of a stem within the fluid passageway is varied so fluid can flow between the inlet and only one of the first and second outlets at a time. Pressure in the lower chamber can be varied by using a second fluid to exert pressure against a bottom end of the stem. Pressure in the upper chamber is varied by using an adjusting screw to urge a spring against the diaphragm.

15 Claims, 8 Drawing Sheets

(51) Int. Cl.
*F16K 31/122* (2006.01)
*F16K 31/126* (2006.01)
*F16K 11/04* (2006.01)
*F16K 17/18* (2006.01)
*F16K 27/02* (2006.01)

(52) U.S. Cl.
CPC ...... *F16K 11/0712* (2013.01); *F16K 31/1221* (2013.01); *F16K 31/1262* (2013.01); *F16K 17/18* (2013.01); *F16K 27/0236* (2013.01); *Y10T 137/86895* (2015.04); *Y10T 137/87764* (2015.04)

(58) Field of Classification Search
CPC .... F16K 11/065; F16K 11/07; F16K 11/0712; F16K 31/1221; F16K 31/1262; F16K 11/025; Y10T 137/86492; Y10T 137/86501; Y10T 137/86549; Y10T 137/86831; Y10T 137/86879; 137/86895; Y10T 137/2567; Y10T 137/2663; Y10T 137/2665; Y10T 137/2668; Y10T 137/2693; Y10T 137/8667; Y10T 137/86686; Y10T 137/8671; Y10T 137/87708; Y10T 137/87748; Y10T 137/87756; Y10T 137/87764; Y10T 137/8778
USPC .... 137/625, 625.11, 625.17, 625.42, 625.48, 137/625.5
See application file for complete search history.

(56) References Cited

U.S. PATENT DOCUMENTS

| | | | | |
|---|---|---|---|---|
| 1,921,092 A | * | 8/1933 | Newton | F15B 13/0405 137/625.27 |
| 2,524,142 A | * | 10/1950 | Seeloff | F16K 11/0712 137/625.48 |
| 2,621,885 A | * | 12/1952 | Schmitt | F16K 1/465 137/542 |
| 2,782,801 A | * | 2/1957 | Ludwig | F16K 11/0712 137/625.48 |
| 3,415,284 A | * | 12/1968 | Stampfli | F16K 11/044 137/625.66 |
| 3,625,246 A | * | 12/1971 | Reaves | F16K 11/07 137/408 |
| 3,661,182 A | * | 5/1972 | Loveless | F16K 11/0712 137/625.48 |
| 3,797,525 A | * | 3/1974 | Lieser | F16K 11/02 137/625.6 |
| 3,951,166 A | * | 4/1976 | Whitener | F16K 11/0712 137/625.27 |
| 4,111,230 A | * | 9/1978 | Stampfli | F16K 11/044 137/625.5 |
| 4,317,469 A | * | 3/1982 | Pauliukonis | F16K 31/426 137/625.27 |
| 4,420,011 A | * | 12/1983 | Roger | F16K 11/048 137/269 |
| 4,448,211 A | * | 5/1984 | Yoshida | F16K 11/048 137/106 |
| 4,726,493 A | * | 2/1988 | Wallace | B67D 1/0082 137/625.27 |
| 5,996,606 A | | 12/1999 | Iwasaki et al. | |
| 6,857,440 B2 | * | 2/2005 | Lind | F16K 17/28 137/112 |
| 8,220,485 B2 | * | 7/2012 | Lovell | F16K 11/048 137/596.17 |
| 2010/0252132 A1 | * | 10/2010 | Neff | F16K 11/07 137/625.17 |
| 2012/0012768 A1 | * | 1/2012 | Yahr | F16K 1/02 251/129.11 |

FOREIGN PATENT DOCUMENTS

| | | | | |
|---|---|---|---|---|
| DE | 4201442 A1 | * | 1/1995 | ......... G05D 16/2013 |
| EP | 1653132 A1 | * | 5/2006 | ............ F16K 11/044 |
| FR | 1145541 A | * | 10/1957 | ............ F16K 11/065 |
| JP | 2012 086723 A | | 5/2012 | |

OTHER PUBLICATIONS

Brazilian Search Report from Brazilian Patent Application No. BR112017008922-0 dated Jul. 30, 2020.

* cited by examiner

PILOT HYDRAULIC SYSTEM FOR OPERATING CONTROL VALVE

CROSS-REFERENCE TO RELATED APPLICATIONS

This application claims priority to U.S. Provisional Patent Application Ser. No. 62/073,703, filed on Oct. 31, 2014, which is incorporated herein by reference in its entirety.

BACKGROUND

The present disclosure relates to a pilot valve system useful for operating control valves. A method of delivering fluid from a first inlet to only one of first and second outlets at a time using such a pilot valve system is also disclosed. Such pilot-controlled valve systems can be used, for example, for managing liquids in the agriculture and municipal and waste management industries.

The present disclosure is an improvement over prior art pilot valve systems. Generally speaking, there are two different types of pilot valve systems: systems that are poppet-based and systems that utilize no poppet valves.

Poppet-based pilot valve systems are generally capable of accuracy of 0.1-0.2 Bar (delta pressure). Poppet-based pilot valve systems are expensive and subject to frequent clogging and faults due to the spring, seal, and poppet design. Clogging and other faults can occur due to sand and other foreign particles being capable of becoming entrapped in a gap present between the poppet and seal of these systems. The result of such clogging and faults can be leaks in the valve, erosion of the seal, and creeping of the spring due to the deposition of the sand or other foreign particles in the gap. Such systems are therefore expensive, time consuming, and labor intensive to maintain.

Pilot valve systems that do not utilize poppets may be referred to as "poppet-free" systems. These systems are generally capable of accuracy of 0.3-0.5 Bar (delta pressure), i.e. less accurate than poppet-based systems. By not utilizing poppet valves, these systems are cheaper and easier to maintain. Moreover, these systems are much less likely to become clogged and become subject to other faults common to poppet-based systems. Notwithstanding, the poor accuracy of these poppet-free systems limit their usage.

It would be desirable to provide a poppet-free pilot valve system that is low-cost, easy to maintain, and decreasingly susceptible to clogging or other faults, thereby overcoming the shortcomings of prior art poppet-based pilot valve systems. It would further be desirable for the poppet-free pilot valve system to be capable of accuracy of 0.1-0.2 Bar, thereby overcoming the shortcomings of existing poppet-free pilot valve systems.

BRIEF DESCRIPTION

The present disclosure overcomes faults with existing pilot valve systems designs with a pilot valve system that is both easier and more economical to manufacture and maintain and more reliable and efficient in operation. In various embodiments, the pilot valve system is designed to be controlled by a pressure differential between upper and lower chambers, which drive the opening and closing of the valve. A diaphragm separates the upper and lower chambers. The lower chamber has a pilot body with a fluid passageway defined therein. The fluid passageway connects a single inlet to both a first outlet and a second outlet. One of the outlets is above the inlet, and the other outlet is below the inlet. A stem is located in the fluid passageway and is adapted to permit flow of a fluid between the inlet and only one of the two outlets at a time. The upper chamber has a compression spring and an adjusting screw for controlling the amount of force provided by the compression spring against the diaphragm, i.e. the pressure of the upper chamber.

When the amount of pressure in the upper chamber is substantially equal to the amount of pressure in the lower chamber, the stem is in a balanced position and the inlet is not fluidly connected to either the first outlet or the second outlet. When the amount of pressure in the upper chamber is greater than the amount of pressure in the lower chamber, the stem is in a down position and the inlet is fluidly connected to the first outlet, but is not fluidly connected to the second outlet. When the amount of pressure in the upper chamber is less than the amount of pressure in the lower chamber, the stem is in a top position and the inlet is fluidly connected to the second outlet, but is not fluidly connected to the first outlet.

The inlet is adapted to receive a first fluid to be diverted to the first or second outlets during operation of the piston valve system. In certain embodiments, the lower chamber has an opening at a bottom end thereof that is adapted to receive a second fluid to exert pressure against the stem. The pressure in the lower chamber is varied using the second fluid, not a spring as with a poppet.

In certain embodiments of the present disclosure, the inlet is located along a first side of the pilot body and the first and second outlets are located along a second side of the pilot body opposite the first side.

In particular embodiments, the pilot valve system includes a first seal and a second seal. The first seal is located along the fluid passageway between the inlet and the first outlet. The second seal is located along the fluid passageway between the inlet and the second outlet.

The stem may, in certain embodiments, include a bottom stop on a bottom end of the stem. The pilot body may also include a pilot stop below the first outlet. The pilot stop is adapted to engage the bottom stop.

In particular embodiments, the fluid passageway may be thought of as having an upper portion, a middle portion, and a lower portion. The middle portion and the lower portion of the fluid passageway are substantially the same width as one another. The width of the upper portion of the fluid passageway is greater than the width of the middle and lower portions.

The stem may be considered, in certain embodiments, as having an upper section, a middle section, a lower section, and first and second intermediate sections. The upper, middle, and lower sections are all substantially the same width. The first and second intermediate sections are of substantially the same width. The width of the first and second intermediate portions is greater than the width of the upper, middle, and lower sections. The first intermediate section separates the upper section from the middle section and the second intermediate section separates the lower section from the middle section.

The pilot valve system of the present disclosure may include a cover that encloses the spring of the upper chamber.

The piston valve system of the present disclosure is capable of an accuracy of 0.1 Bar to 0.2 Bar (delta pressure). The pilot valve system of the present disclosure is a poppet-free system (i.e., the pilot body does not include any poppet valves).

Also disclosed in various embodiments are methods for delivering fluid from a first inlet to only one of a first outlet and a second outlet at a time using the pilot valve system previously described. The methods comprise providing the pilot valve system as previously described, flowing a first fluid through the inlet in the lower chamber, and flowing a second fluid through the opening at the bottom end of the lower chamber to control the location of the stem within the fluid passageway based on the pressure differential between the upper chamber and the lower chamber.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
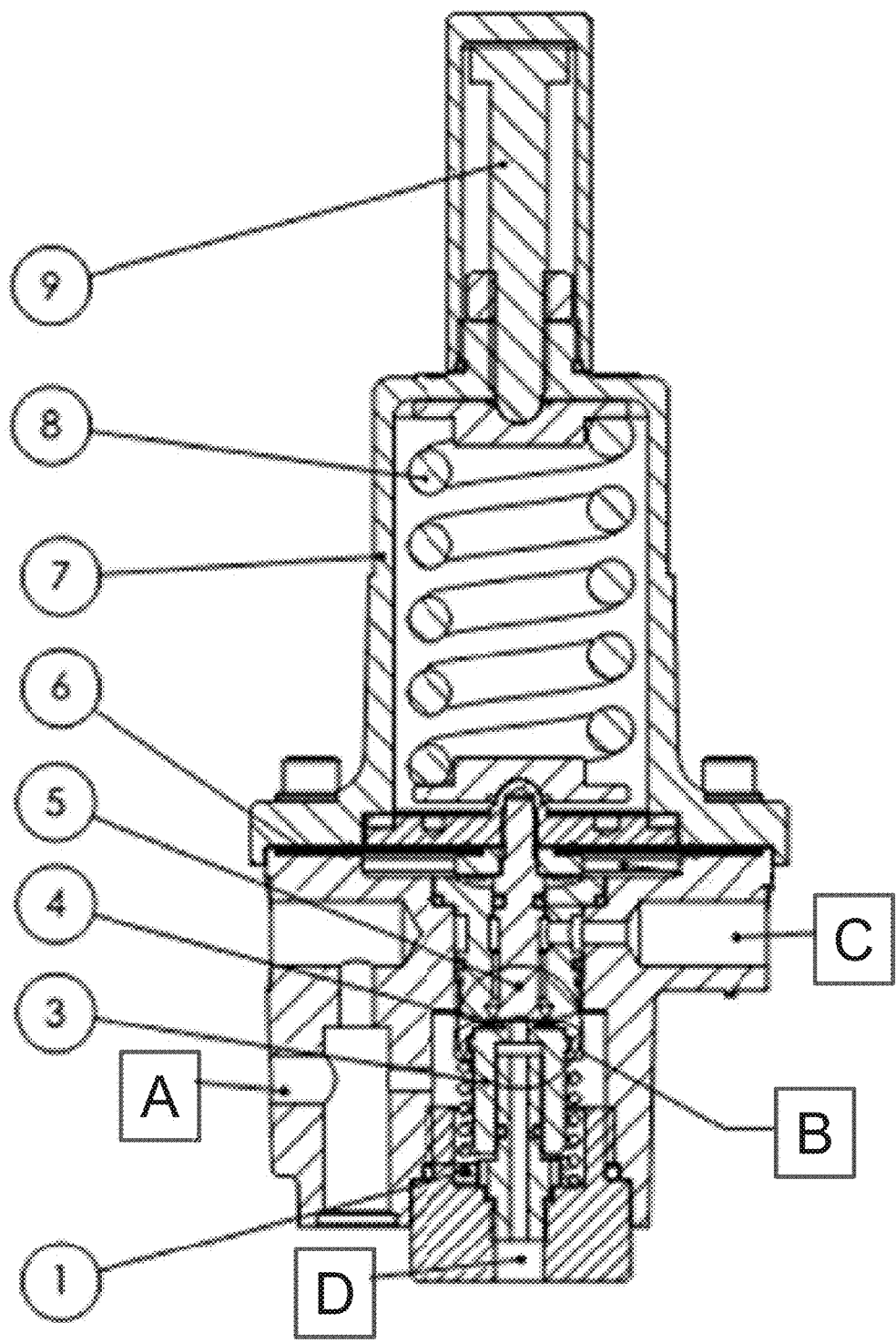
FIG. 1 is a cross-sectional view of a prior art poppet-based pilot valve system.

A more complete understanding of the components, processes, apparatuses, and systems disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the open-ended transitional phrases "comprise(s)," "include(s)," "having," "contain(s)," and variants thereof require the presence of the named ingredients/steps and permit the presence of other ingredients/steps. These phrases should also be construed as disclosing the closed-ended phrases "consist of" or "consist essentially of" that permit only the named ingredients/steps and unavoidable impurities, and exclude other ingredients/steps.

Numerical values used herein should be understood to include numerical values which are the same when reduced to the same number of significant figures and numerical values which differ from the stated value by less than the experimental error of the measurement technique described for determining the value.

All ranges disclosed herein are inclusive of the recited endpoint and independently combinable (for example, the range of "from 2 grams to 10 grams" is inclusive of the endpoints, 2 grams and 10 grams, and all the intermediate values).

The term "about" can be used to include any numerical value that can carry without changing the basic function of that value. When used with a range, "about" also discloses the range defined by the absolute values of the two endpoints, e.g., "about 2 to about 4" also discloses the range "from 2 to 4." The term "about" may refer to plus or minus 10% of the indicated number.

The term "substantially" may refer to the complete or nearly complete extent or degree of an action, characteristic, structure, or result. That is, for example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. Use of the term "substantially" is equally applicable when used in a negative connotation to refer to the complete or near complete lack of an action, characteristic, structure, or result. That is, for example, a composition that is "substantially free of" particles would either completely lack particles, or so nearly completely lack particles that the effect would be the same as if it completely lacked particles. Put another way, an object that is "substantially free of" an element may still actually contain such element as long as there is no measurable effect from the presence of the element therein.

The present disclosure relates to a pilot valve system designed to be controlled based on the pressure differential between upper and lower chambers of the pilot valve system. By changing the pressure differential, the system can accept a fluid and deliver the fluid to one of two different outlets. Put another way, the pilot valve system can deliver fluid from an inlet to a desired outlet while ensuring that fluid does not flow to another outlet.

FIG. 1 is a cross-sectional view of a prior art poppet-based pilot valve system. The system includes a diaphragm 6 between two chambers. The upper chamber has a spring 8 and an adjustment screw 9. The spring 8 is enclosed by a cover 7. The lower chamber has a poppet 3, a spring 1, a seal 4 mounted on the poppet 3, and a stem 5, inlet D, and outlets A and C. The value of the setpoint pressure, or the pressure threshold which must be exceeded to move the stem upward and unseal the valve, is set by urging the spring 8 against the diaphragm 6 using the screw 9. The pressure in the lower chamber is determined by the pressure exerted by the spring 1 in the lower chamber and the fluid pressure from inlet D. When the pressure in the lower chamber is sufficient to urge the stem 5 upwards, the poppet 3 opens, fluidly connecting the inlet D to the outlet C. When the pressure in the upper chamber exceeds the pressure in the lower chamber so that the stem 5 is pushed downwards, the inlet D is fluidly connected to outlet A.

Figure 2:
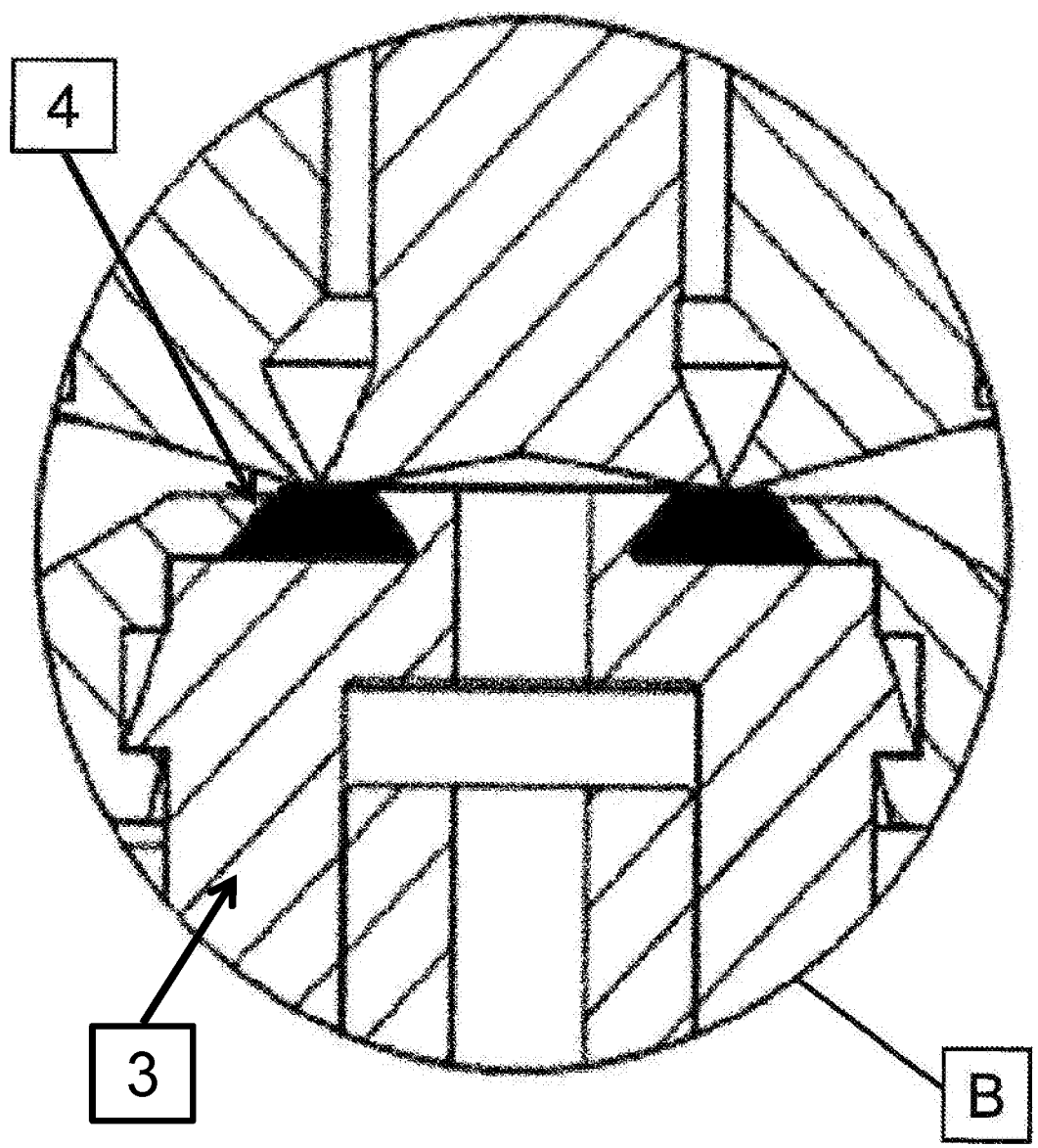
FIG. 2 is an enlarged cross-sectional view of a section of the prior art poppet-based pilot valve system of FIG. 1.

FIG. 2 is a cross-sectional view of the prior art poppet-based pilot valve system of FIG. 1, enlarging section B of FIG. 1. In this view, the poppet 3 and the valve 4 can be more clearly seen. When the poppet opens, a gap is present between the stem and the seal 4. This gap controls the amount of fluid flowing between the inlet and the outlet. Due to the force of the fluid flowing through the gap, sand, dirt, and other foreign particles are commonly pulled into the system. These particles can quickly cause to clogging of the inlet and/or outlets, in addition to erosion of the seal, thereby causing unwanted and potentially dangerous leaks in the system.

Figure 3:
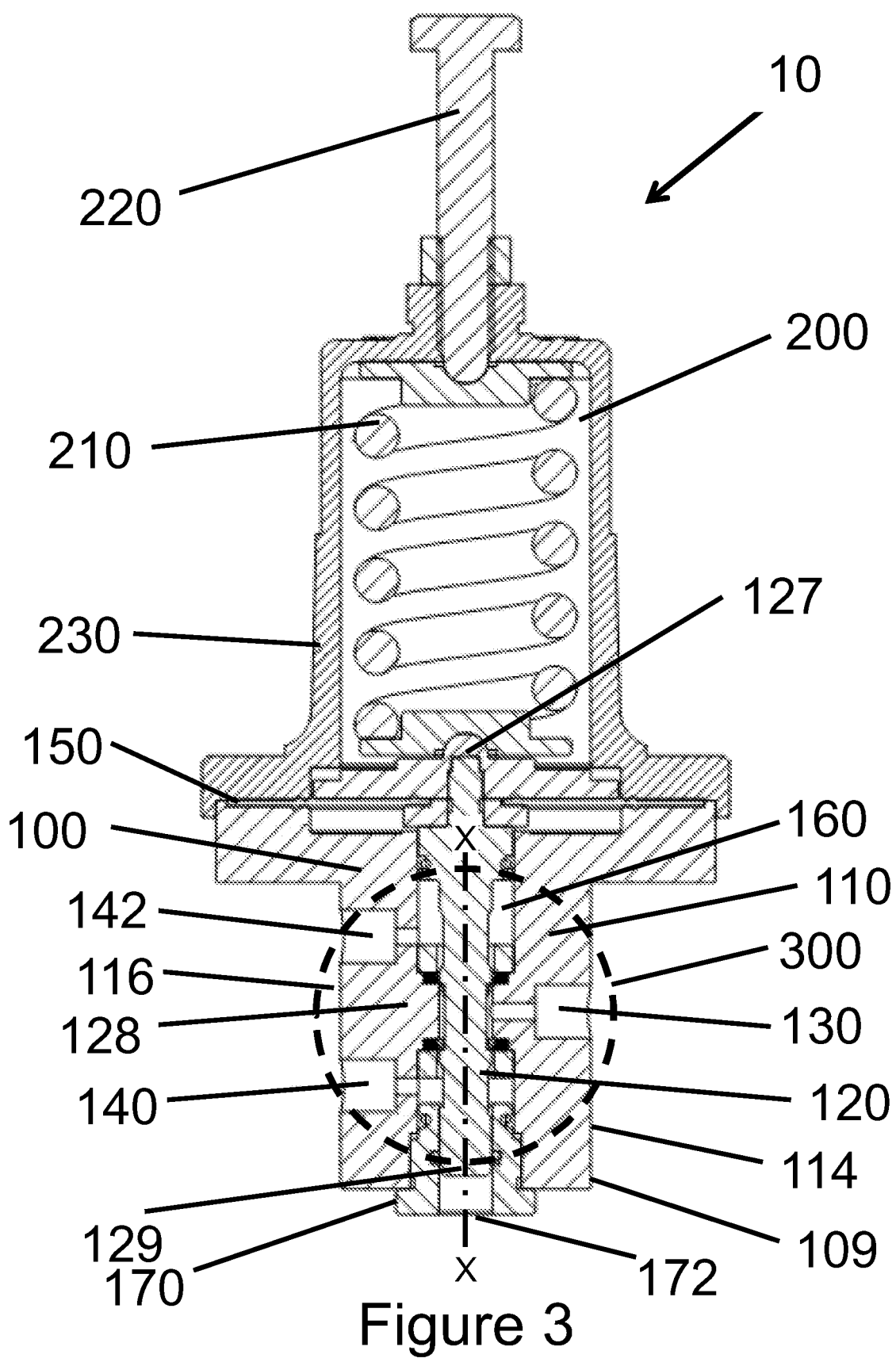
FIG. 3 is a cross-sectional view of a pilot valve system according to the present disclosure.

FIG. 3 is a cross-sectional view of a pilot valve system of the present disclosure. The pilot valve system 10 includes a lower chamber 100 and an upper chamber 200 separated by a diaphragm 150. It should be noted that the three-dimensional pilot valve system can be any appropriate shape, e.g. cylindrical, cubical, rectangular. The lower chamber 100 includes a pilot body 110 and a stem 120. The pilot body 110 generally surrounds the stem 120. The pilot body 110 includes a fluid passageway 160 connecting an inlet 130 to a first outlet 140 and to a second outlet 142. The fluid passageway 160 runs along a longitudinal (here vertical) axis X-X of the pilot body, and is located within the center of the pilot body. In the embodiment shown in FIG. 1, the inlet 130 is located along a first side 114 of the pilot body 110 and the first outlet 140 and second outlet 142 are located along a second side 116 of the pilot body 110. The first side 114 of the pilot body 110 is opposite the second side 116 of the pilot body 110 and is separated therefrom by the fluid passageway 160. The inlet 130 is adapted to receive a first fluid. The fluid passageway 160 defines the space in which fluid entering the pilot body 110 through the inlet 130 may flow. There is a neck 128 in the fluid passageway at the level of the inlet 130, and between the two outlets 140, 142.

The stem 120 is located in the fluid passageway 160. The stem 120 is adapted to permit fluid entering the fluid passageway 160 through the inlet 130 to flow between the inlet 130 and only one of the first outlet 140 and the second outlet 142 at a time. That is, fluid entering the fluid passageway 160 through the inlet 130 can be delivered to one of either the first outlet 140 or the second outlet 142 at a time, which is controlled by the location of the stem 120 in the fluid passageway 160. A top end 127 of the stem engages the diaphragm 150. A bottom end 129 of the stem 120 extends below the neck 128.

The upper chamber 200 includes a compression spring 210 and an adjusting screw 220. The adjusting screw 220 engages the compression spring 210 and controls the amount of force provided by the compression spring 210 against the diaphragm 150. In this way, the adjusting screw 220 forces the compression spring 210 against the diaphragm 150, thereby increasing the pressure from the upper chamber 200. The compression spring 210 is enclosed by a cover 230.

In particular embodiments, the lower chamber 100 includes a plug 170 that is used to seal the fluid passageway 160 at a bottom end 109 of the lower chamber 100, below the stem 120. The plug includes a central bore or opening 172 that is narrower than the fluid passageway. The bottom end 129 of the stem extends into and seals the opening. The opening 172 is adapted to receive a second fluid. The second fluid is used to control the amount of pressure provided by the upper end 127 of the stem 120 against the diaphragm 150. Put another way, the second fluid exerts pressure against the bottom end 129 of the stem, which forces the upper end 127 of the stem 120 against the diaphragm 150, thereby increasing the pressure from the lower chamber 100. In contrast to the prior art design of FIG. 1, no spring surrounds the stem to provide pressure against the diaphragm. Rather, the second fluid pushing against the bottom end 129 of the stem is used to control the pressure differential and the resulting position of the stem 120 within the fluid passageway 160.

Figure 4:
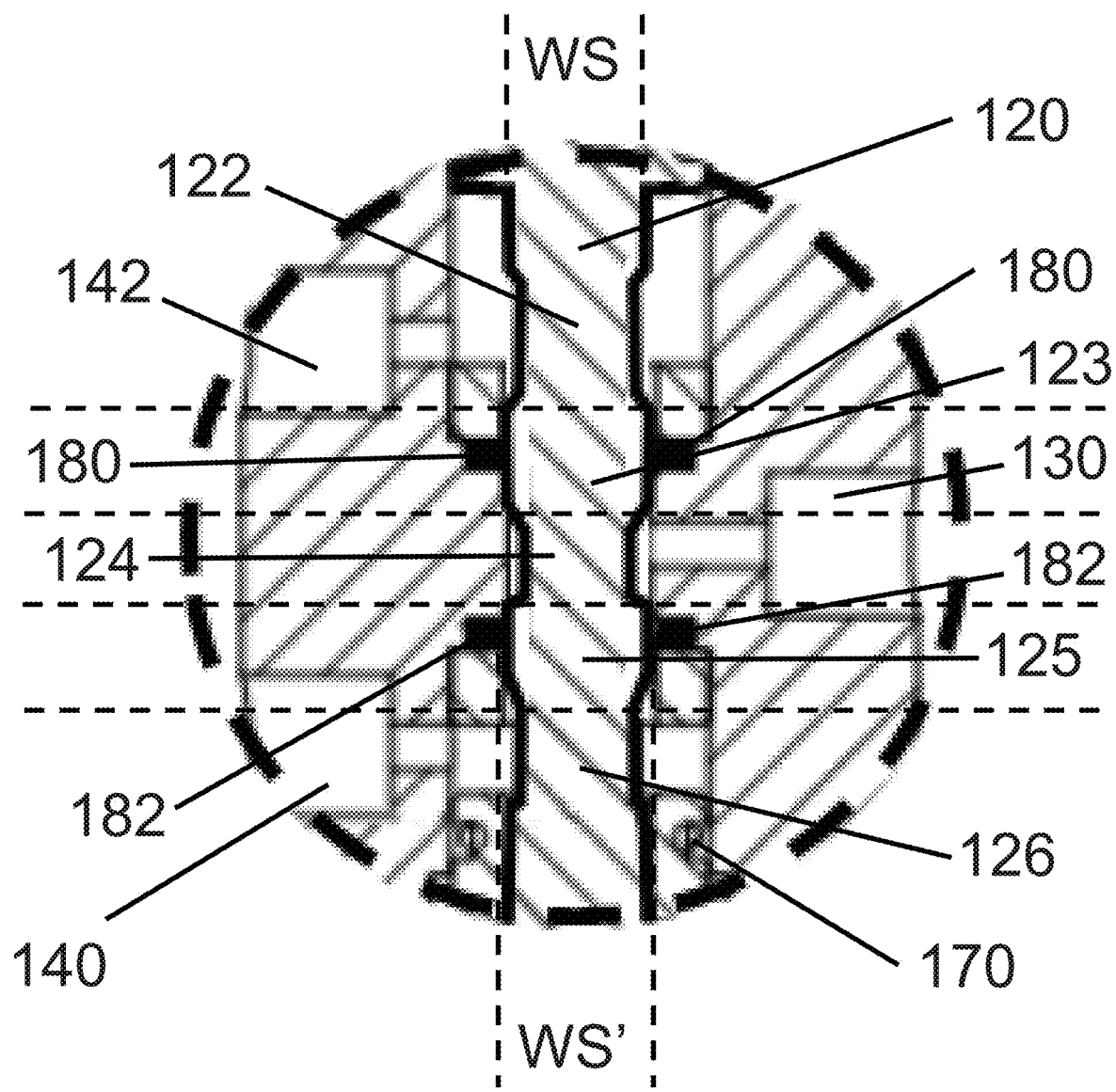
FIG. 4 is an enlarged cross-sectional view of a section of the pilot valve system of FIG. 3, showing the stem within the fluid passageway. In this view, the upper, middle, lower, and first and second intermediate sections of the stem can be seen. Further visible in this view are the pilot stop, the first seal, and the second seal.

Turning now to FIG. 4, an enlarged cross-sectional view of section 300 of the pilot valve system of FIG. 3 is shown. Here, it can be seen that the stem 120 includes an upper section 122, a middle section 124, and a bottom section 126. Also shown here, the upper, middle, and lower sections of the stem are all of substantially the same width. The width of the upper, middle, and lower sections of the stem is indicated as WS. The stem 120 shown here further includes a first intermediate section 123 and a second intermediate section 125. The first intermediate section 123 separates the upper section 122 from the middle section 124. The second intermediate section 125 separates the middle section 124 from the lower section 126. As shown here, the first and second intermediate sections of the stem are of substantially the same width. The width of the first and second intermediate sections of the stem is indicated as WS'. Width WS' is greater than width WS. The first and second intermediate sections engage seals 180, 182 located on the internal sides of the fluid passageway 160. The first seal 180 is located between the inlet 130 and the first outlet 140. The second seal 182 is located between the inlet 130 and the second outlet 142. The seals of the first and second seal provide surfaces with which the stem 120, specifically the first and second intermediate sections of the stem, can engage to form a substantially fluid-tight closure therewith. In this way, fluid in the fluid passageway 160 cannot escape therefrom, except through the first and second outlets. When the stem 120 is urged up or down in the fluid passageway 160, the various sections of the stem 120 align with different sections of the fluid passageway 160 to permit or restrict fluid flow through different paths in the fluid passageway. The plug 170 is also visible.

Figure 5:
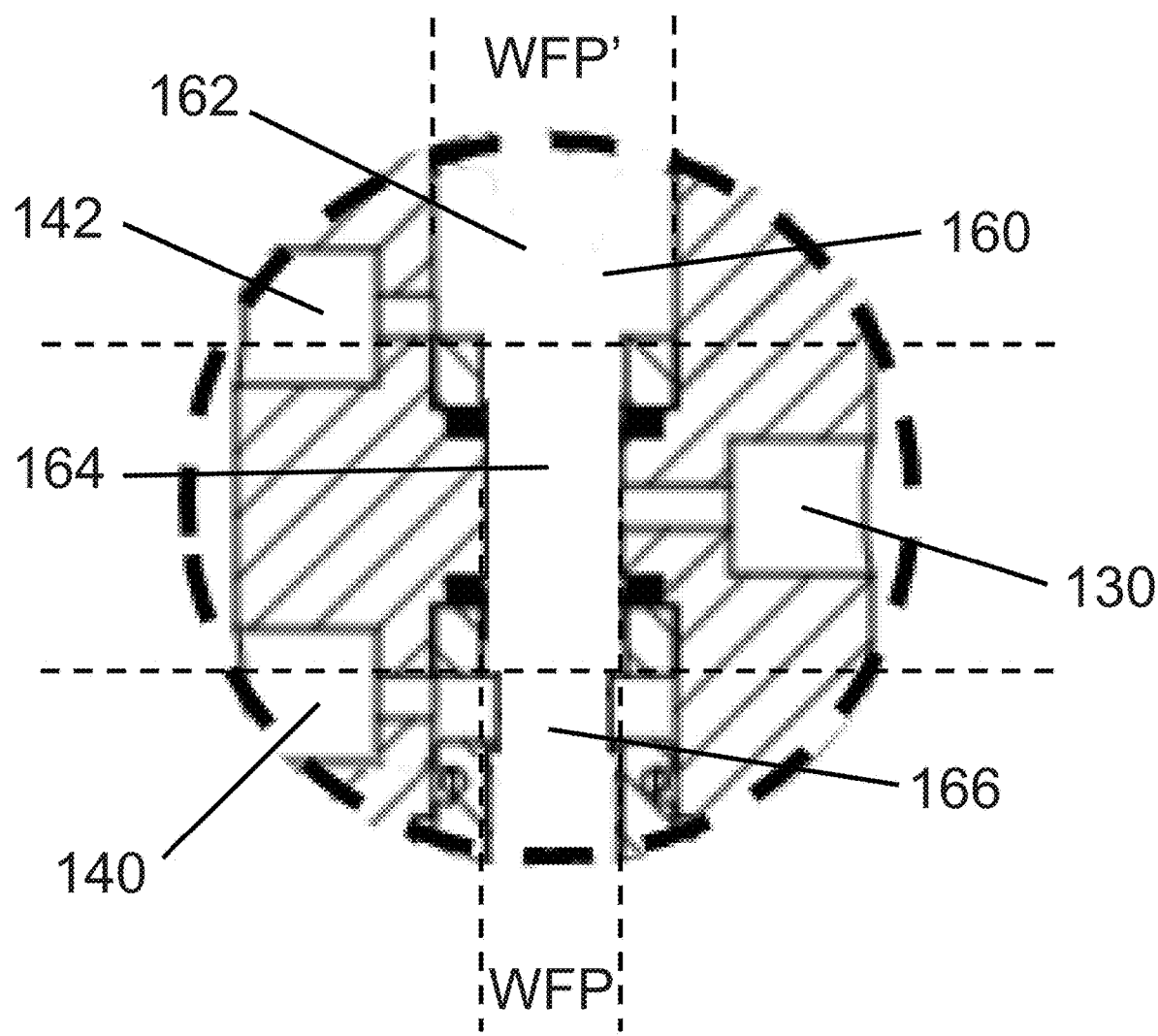
FIG. 5 is another enlarged cross-sectional view of the same section of the pilot valve system of FIG. 3, showing only the fluid passageway with the stem removed for clarity. In this view, the upper, middle, and lower, portions of the fluid passageway can be seen. Further visible in this view are the first seal and the second seal.

FIG. 5 is an enlarged cross-sectional view of the same section 300 of the pilot valve system of FIG. 3. The stem has been removed from the fluid passageway 160 in order to more readily show additional features of the fluid passageway. Here, the fluid passageway 160 includes an upper portion 162, a middle portion 164, and a lower portion 166. The middle portion 164 separates the upper portion 162 from the lower portion 166, and is generally aligned with the fluid inlet 130. As shown here, the upper and lower portions of the fluid passageway are of substantially the same width. The width of the middle portions of the fluid passageway are indicated as WFP. The width of the upper and lower portions is indicated as WFP'. As shown here, width WFP' is greater than width WFP. This corresponds to the neck 128 visible in FIG. 3. This structure of the fluid passageway allows the stem 120 to be seated within the fluid passageway 160 and form a substantially fluid-tight closure therein. In this way, fluid in the fluid passageway 160 cannot escape therefrom, except through the first and second outlets 140, 142.

Figure 6:
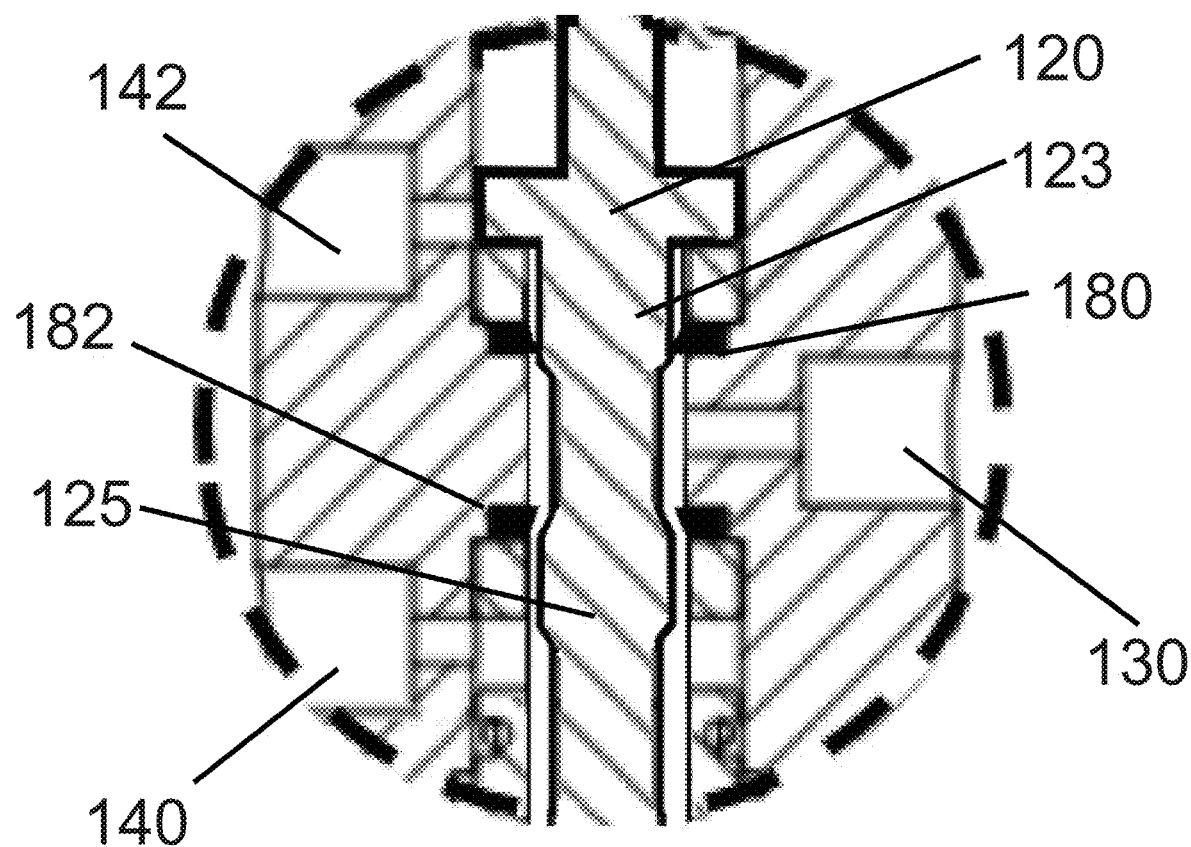
FIG. 6 is another enlarged cross-sectional view of the same section of the pilot valve system of FIG. 3 showing the stem in a "down" position.

FIG. 6 is an enlarged cross-sectional view of the same section 300 of the pilot valve system of FIG. 3 showing the stem 120 in a "down" position. The stem 120 is in the down position when the amount of pressure in the upper chamber 200 is greater than the amount of pressure in the lower chamber 100. When the stem is in the down position, fluid flows into the fluid passageway 160 from the inlet 130 to the first outlet 140, but fluid is restricted from flowing to the second outlet 142. Fluid is capable of flowing from the inlet 130 to the first outlet 140 because the first intermediate portion 123 is still aligned with first seal 180, restricting fluid from flowing from the inlet 130 to the second outlet 142. However, the second intermediate portion 125 is not sealed against the second seal 182, permitting fluid to flow around the second intermediate portion and through the first outlet 140. The seal of the plug 170 with the stem 120 prevents fluid from leaking out of the fluid passageway 160 around the stem.

Figure 7:
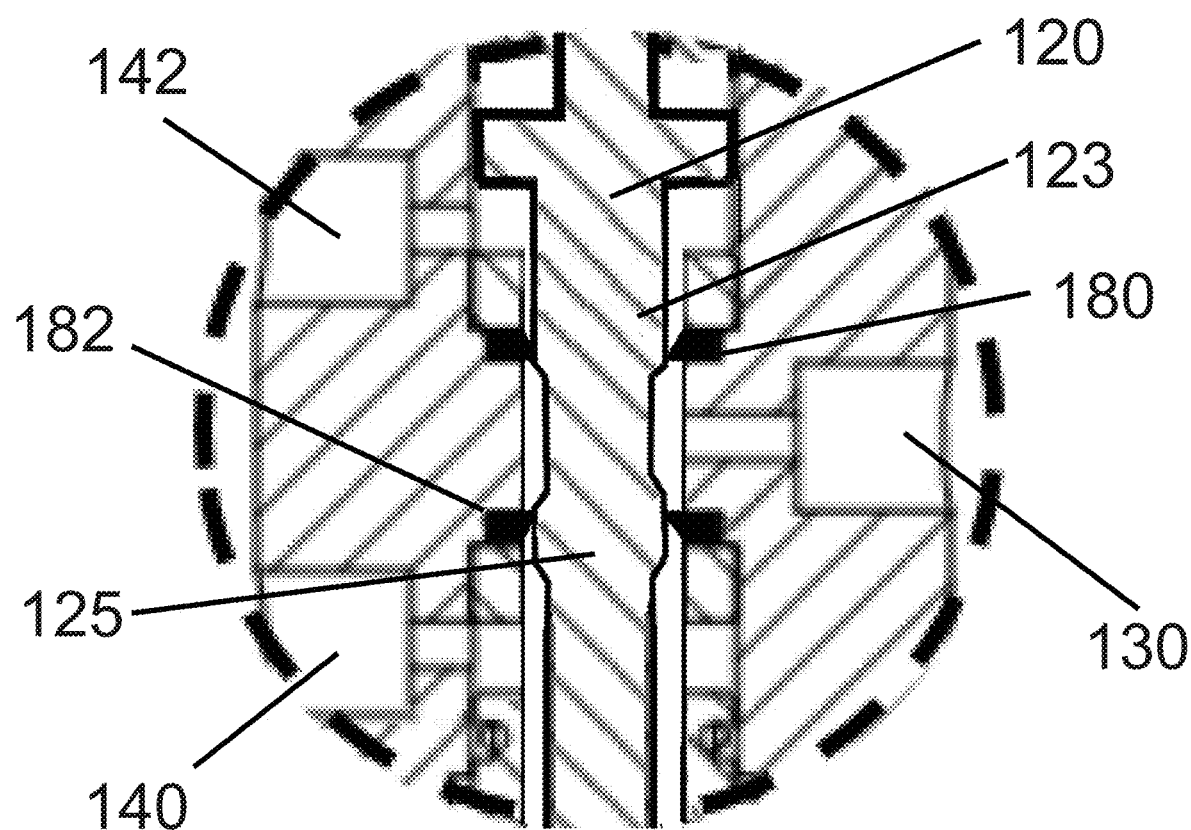
FIG. 7 is another enlarged cross-sectional view of the same section of the pilot valve system of FIG. 3 showing the stem in a "balanced" position.

FIG. 7 is another enlarged cross-sectional view of the same section 300 of the pilot valve system of FIG. 3 showing the stem 120 in a "balanced" position. The stem 120 is in the balanced position when the amount of pressure in the upper chamber 200 is substantially equal to the amount of pressure in the lower chamber 100. When the stem is in the balanced position, the first intermediate portion 123 is aligned with first seal 180, restricting fluid from flowing from the inlet 130 to the second outlet 142. The second intermediate portion 125 is also aligned with second seal 182, restricting fluid from flowing from the inlet 130 to the first outlet 140. Put another way, fluid is restricted from flowing to either of the first outlet 140 or the second outlet 142. The range of this "balanced" position can be varied by changing the height of the intermediate portions 123, 125.

Figure 8:
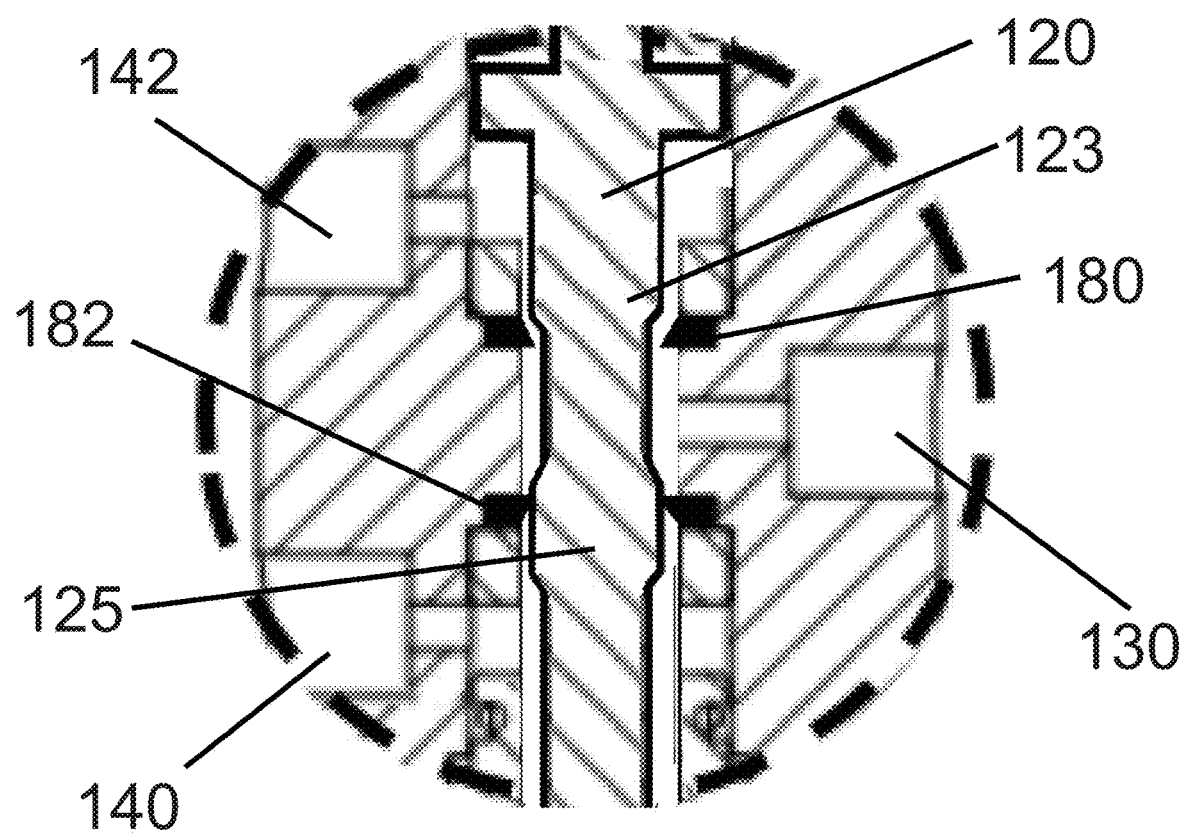
FIG. 8 is yet another enlarged cross-sectional view of the same section of the pilot valve system of FIG. 3 showing the stem in a "top" position.

FIG. 8 is another enlarged cross-sectional view of the same section 300 of the pilot valve system of FIG. 3 showing the stem 120 in a "top" position. The stem 120 is in the top position when the amount of pressure in the lower chamber 100 is greater than the amount of pressure in the upper chamber 200. When the stem is in the top position, fluid flows into the fluid passageway 160 from the inlet 130 to the second outlet 142, but fluid is restricted from flowing to the first outlet 140. Fluid is capable of flowing from the inlet 130 to the second outlet 142 because the second intermediate portion 125 is still aligned with second seal 182, restricting fluid from flowing from the inlet 130 to the first outlet 140. However, the first intermediate portion 123 is not sealed against the first seal 180, permitting fluid to flow around the first intermediate portion and through the second outlet 142.

Due to the poppet-free design, the pilot valve system allows accurate control with an accuracy of 0.2 bar or lower, while avoiding clogging of a poppet or erosion of a seal. Easy repair and easy indication of clogging is also provided.

The present disclosure has been described with reference to preferred embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A method of delivering fluid from an inlet to only one of a first outlet and a second outlet using a pilot valve system, comprising:
   providing a pilot valve system comprising:
   a lower chamber formed from:
      a pilot body having a fluid passageway defined along a central longitudinal axis thereof, the fluid passageway connecting an inlet to a first outlet located at a lower portion of the fluid passageway and a second outlet located at an upper portion of the fluid passageway, the upper and lower portions of the fluid passageway having a substantially similar width; and
      a neck in the fluid passageway aligned with the inlet, the neck positioned between the upper and lower portions of the fluid passageway and having a width that is less than the width of the upper and lower portions of the fluid passageway, the width of the fluid passageway at the neck being constant along the central longitudinal axis of the pilot body; and
      a stem in the fluid passageway, comprising an upper section, a middle section, a lower section, and first and second intermediate sections;
      wherein the upper, middle, and lower sections are all of substantially the same width;
      wherein the first intermediate section separates the upper section from the middle section and the second intermediate section separates the lower section from the middle section; and
      wherein the first and second intermediate sections are of substantially the same width, the width of the first and second intermediate sections being greater than the width of the upper, middle, and lower sections; and
      wherein the first and second intermediate sections pass through the neck of the fluid passageway; and
      a first stationary seal located on internal sides of one end of the upper portion of the fluid passageway and a second stationary seal located on internal sides of one end of the lower portion of the fluid passageway, the first and second stationary seals adapted to form a substantially fluid-tight closure with the stem, wherein the neck of the fluid passageway is located between the first and second stationary seals;
   an upper chamber separated from the lower chamber by a diaphragm, the upper chamber including:
      a compression spring; and
      an adjusting screw for controlling the amount of force provided by the compression spring against the diaphragm;
   flowing a first fluid through the inlet at the neck of the fluid passageway; and
   flowing a second fluid through an opening at a bottom end of the lower chamber to control a placement of the stem within the fluid passageway and determining whether fluid flows to the first outlet at the lower portion of the fluid passageway or the second outlet at the upper portion of the fluid passageway;
   wherein the pilot valve system is adapted to deliver fluid from the inlet to one outlet while ensuring that fluid does not flow to the other outlet at the same time.

2. The method of claim 1, wherein when the amount of pressure in the upper chamber is substantially equal to the amount of pressure in the lower chamber, the stem is in a balanced position and the first fluid does not flow from the inlet to either of the first outlet or the second outlet.

3. The method of claim 1, wherein when the amount of pressure in the upper chamber is greater than the amount of pressure in the lower chamber, the stem is in a down position and the first fluid flows from the inlet to the first outlet, but does not flow to the second outlet.

4. The method of claim 1, wherein when the amount of pressure in the upper chamber is less than the amount of pressure in the lower chamber, the stem is in a top position and the first fluid flows from the inlet to the second outlet, but does not flow to the first outlet.

5. A pilot valve system, comprising:
   a lower chamber formed from:
   a pilot body having a fluid passageway defined along a central longitudinal axis thereof, the fluid passageway connecting an inlet to a first outlet and a second outlet and having an upper portion, a lower portion, and a middle portion, wherein the upper portion of the fluid passageway is substantially the same width as the lower portion of the fluid passageway and the middle portion has a width that is constant along the central longitudinal axis of the pilot body and fluid passageway, wherein the constant width of the middle portion is less than the width of the upper and lower portions of the fluid passageway; and a stem in the fluid passageway, the stem including:
  an upper section, a middle section, a lower section, and first and second intermediate sections;
  wherein the upper, middle, and lower sections are all of substantially the same width;
  wherein the first intermediate section separates the upper section from the middle section and the second intermediate section separates the lower section from the middle section; and
  wherein the first and second intermediate sections are of substantially the same width, the width of the first and second intermediate sections being greater than the width of the upper, middle, and lower sections; and wherein the first and second intermediate sections pass through the middle portion of the fluid passageway; and a first stationary seal located internally at one end of the upper portion of the fluid passageway and a second stationary seal located internally at one end of the lower portion of the fluid passageway, the first and second stationary seals adapted to form a substantially fluid-tight closure with the stem, wherein the middle portion of the fluid passageway is located between the first and second stationary seals; and an upper chamber separated from the lower chamber by a diaphragm, the upper chamber including:
  a compression spring; and
  an adjusting screw for controlling the amount of force provided by the compression spring against the diaphragm;
wherein the pilot valve system is adapted to deliver fluid from the inlet to one outlet while ensuring that fluid does not flow to the other outlet at the same time.

6. The system of claim 5, wherein the lower chamber includes an opening at a bottom end thereof which is sealed by the stem.

7. The system of claim 6, wherein the inlet is adapted to receive a first fluid and the opening at the bottom end of the lower chamber is adapted to receive a second fluid that exerts pressure on the stem.

8. The system of claim 7, wherein the inlet is located on a first side of the pilot body and the first and second outlets are located on a second side of the pilot body opposite the first side.

9. The system of claim 8, wherein the inlet is located between the first outlet and the second outlet along the central longitudinal axis of the fluid passageway.

10. The system of claim 7, wherein when the amount of pressure in the upper chamber is substantially equal to the amount of pressure in the lower chamber, the stem is in a balanced position and the first fluid does not flow from the inlet to either the first outlet or the second outlet.

11. The system of claim 5, wherein the first stationary seal is located between the inlet and the first outlet of the fluid passageway, the second stationary seal is located between the inlet and the second outlet of the fluid passageway, and the first and second stationary seals engage the first and second intermediate sections of the stem to form the substantially fluid-tight closure therewith.

12. The system of claim 5, wherein when the amount of pressure in the upper chamber is greater than the amount of pressure in the lower chamber, the stem is in a down position and a fluid flow path is present from the inlet to the first outlet, but not from the inlet to the second outlet.

13. The system of claim 5 wherein when the amount of pressure in the upper chamber is less than the amount of pressure in the lower chamber, the stem is in a top position and a fluid flow path is present from the inlet to the second outlet, but not from the inlet to the first outlet.

14. The system of claim 5, further comprising a cover extending peripherally about the spring of the upper chamber.

15. The system of claim 5, wherein a top end of the stem engages the diaphragm.

* * * * *